United States Patent Office 3,479,284
Patented Nov. 18, 1969

3,479,284
SEPARATION OF FINELY DIVIDED SOLIDS FROM LIQUID SUSPENSIONS THEREOF
Ronald D. Lees, Wilmington, Del., assignor to Hercules Incorporated, Wilmington, Del., a corporation of Delaware
No Drawing. Filed Mar. 30, 1967, Ser. No. 626,942
Int. Cl. C02b 1/20
U.S. Cl. 210—54                                       5 Claims

ABSTRACT OF THE DISCLOSURE

The present invention relates to a process of separating finely divided predominantly inorganic solids from liquid suspensions thereof wherein an acrylamide-acrylate copolymer is employed as a coagulant separating aid.

---

This invention relates to a process for aiding the separation of solids from liquid suspensions thereof and more particularly to such a process wherein a flocculating agent is added to said suspensions in an amount sufficient to produce flocculation (coagulation) of said solids, thereby facilitating liquid-solids separation by inducing settling of the solids and also by making it substantially less difficult to dewater the settled solids by known techniques such as e.g. filtration, centrifugation or other dewatering processes.

The present invention is helpful especially in flocculating solids in turbid liquid such as for example those in mining and other industrial operations. Typical examples of systems to which the present invention is applicable include for instance aqueous suspensions of coal, titanium dioxide, ores (e.g. copper), clays (e.g. kaolin), etc.

In accordance with the present invention it has been found that the addition of a small amount of a particular acrylamide-alkali metal or ammonium acrylate copolymer to liquid suspensions of solids provides a highly effective and economical means of aiding the separation of the solids from the liquids. More particularly, the present invention provides such a process of aiding the separation of finely divided predominantly inorganic solids from aqueous suspensions thereof whereby a small amount of said copolymer is admixed with said suspensions.

The following examples wherein percent and parts are by weight unless otherwise indicated illustrate various embodiments of the present invention. These examples are not intended to limit the present invention beyond the scope of the appended claims. In these examples and elsewhere herein parts, percent and ratios are by weight unless otherwise indicated. All molecular weights given in the examples and elsewhere herein of the copolymers were measured as reduced specific viscosity (RSV) employing the well known Ubbelohde Viscometer on a 0.1% solution of the copolymer in 0.1 M KCl at 25° C.

EXAMPLES 1–10

Copper ore slurries

These runs were carried out in order to determine the effect of various flocculating agents on the flocculation and settling of suspended solids in copper ore tailings.

A sample of San Manuel copper ore containing about 0.9 percent copper in the form of chalcopyrite (chief impurities being quartz and feldspar) was ground in a ball mill to minus 48 mesh in the presence of one ton of water and 11 lbs. of lime. The amounts of materials used in these runs were per ton of ore on a dry weight basis, unless otherwise indicated. The resulting ore pulp was transferred to a Denner flotation cell and mixed with 0.5 lb. secondary butyl xanthate and then with 0.05 lb. pine oil. The copper in the ore was floated by opening the air intake valve of the flotation cell. The copper concentrate in the broth that formed was removed by scraping it from the surface of the pulp liquor.

Flocculating agent was added to each of several 100-ml. portions in glass-stoppered graduated cylinders of the aqueous suspension of solids (i.e. the tailings which contained approximately 0.1% copper based on the total weight of slurry) remaining after the above flotation treatment of the copper ore. The cylinders were then rotated 20 times through 360 degrees to insure adequate mixing which they were allowed to stand 5 minutes. The ml. of supernatant formed during standing was measured.

Further details appear in Table 1 hereinafter.

TABLE 1.—COPPER ORE TAILINGS

| | Flocculating Agent | | | Ml. Supernatant After Standing 5 Mins. |
|---|---|---|---|---|
| Ex. No. | Name [a] | Amount [b] | RSV | |
| 1 | None | None | | 6 |
| 2 | Commercial Flocculating agent | 12.5 | | 32 |
| 3 | do | 25.0 | | 29 |
| 4 | 90% Acrylamide-10% Sodium Acrylate | 25.0 | 19 | 40 |
| 5 | do | 100.0 | 19 | 76 |
| 6 | 75% Acrylamide-25% Sodium Acrylate | 12.5 | 31 | 48 |
| 7 | do | 25.0 | 31 | 55 |
| 8 | 50% Acrylamide-50% Sodium Acrylate | 1.0 | 67 | 10 |
| 9 | do | 12.5 | 67 | 55 |
| 10 | do | 25.0 | 67 | 60 |

[a] Examples 2 and 3 used an acrylamide-based anionic flocculating agent available commercially as "Separan NP-10."
[b] P.p.m. dry weight basis by weight of total dry solids in slurry treated, added as a 0.1% aqueous solution.

EXAMPLES 11–21

Coal wash waters with alum

These runs were carried out in order to determine the effect of various flocculating agents on the flocculation and settling of suspended solids in coal wash waters containing alum.

Coal entering a processing plant is ground and screened. The large pieces are then washed and dried. The resulting aqueous slurry of fines are pumped to a series of large settling basins. Alum, i.e. substantially anhydrous aluminum sulfate, is added to the aqueous slurry to enhance settling of the fines. The settled fines are either reprocessed or discarded.

Flocculating agent was added to each of several 100-ml. portions in glass-stoppered graduated cylinders of the above aqueous suspensions of solids remaining after the washing and grinding of the coal. The cylinders were then rotated 20 times through 360 degrees to insure adequate mixing after which they were allowed to stand 5 minutes.

The ml. of supernatant formed during standing was measured.

Further details appear in Table 2 hereinafter.

TABLE 2.—COAL WASH WATERS WITH ALUM [c]

| Ex. No. | Flocculating Agent | | RSV | Ml. Supernatant After Standing 5 Mins. |
|---|---|---|---|---|
| | Name [a] | Amount [b] | | |
| 11 | None | None | | 10 |
| 12 | Commercial Flocculating agent | 120.0 | | 45 |
| 13 | 90% Acrylamide-10% Sodium Acrylate | 40.0 | 16 | 51 |
| 14 | do | 120.0 | 16 | 65 |
| 15 | do | 400.0 | 16 | 82 |
| 16 | 50% Acrylamide-50% Sodium Acrylate | 40.0 | 67 | 15 |
| 17 | do | 20.0 | 67 | 30 |
| 18 | do | 40.0 | 67 | 69 |
| 19 | do | 120.0 | 67 | 79 |
| 20 | 25% Acrylamide-75% Sodium Acrylate | 4.0 | 31 | 25 |
| 21 | do | 40.0 | 31 | 79 |

[a] Example 12 used an acrylamide-based anionic flocculating agent available commercially as "Separan NP-10."
[b] P.p.m. dry weight basis by weight of total dry solids in slurry treated, added as a 0.1% aqueous solution.
[c] 1,520.0 p.p.m. alum by weight of total dry solids in slurry treated.

EXAMPLES 22–26

Coal wash waters without alum

These runs were carried out to determine the effect of various flocculating agents on the flocculation and settling of suspended solids in coal wash waters in the absence of alum.

The procedure of sample prepartion and testing was the same as for the foregoing Examples 11–21 except no alum was used.

Further details appear in Table 3 hereinafter.

TABLE 3.—COAL WASH WATERS WITHOUT ALUM

| Ex. No. | Flocculating Agent | | RSV | Ml. Supernatant After Standing 5 Mins. |
|---|---|---|---|---|
| | Name [a] | Amount [b] | | |
| 22 | None | None | | 9 |
| 23 | Commercial Flocculating agent | 120.0 | | 54 |
| 24 | 90% Acrylamide-10% Sodium Acrylate | 4.0 | | 15 |
| 25 | do | 40.0 | | 73 |
| 26 | do | 400.0 | | 30 |

[a] Example 23 used a hydrolyzed polyacrylonitrile anionic flocculating agent available commercially as "Aerofloc 550."
[b] P.p.m. dry weight basis by weight of total dry solids in slurry treated, added as a 0.1% aqueous solution.

EXAMPLE 27–34

TiO₂ slurries

These runs were carried out to determine the effect of various flocculating agents on the flocculation and settling of $TiO_2$ suspensions.

In the processing of titanium dioxide ore, it is dried and ground. The ground ore (including fines) is acid treated in the presence of catalysts, water, air and steam to convert to a soluble titanium salt. The resulting slurry is pumped to tanks and allowed to settle. The partially clarified liquor thus obtained is further clarified by treating with diatomaceous earth, passing through porous Carborundum, vacuum crystallizing and then pumped to a second series of settling tanks. The liquor from the second series of settling tanks (which contains $TiO_2$ in solution) is evaporated and the $TiO_2$ insolubilized by hydrolysis. The resulting $TiO_2$ precipitate (about 20% solids) is slurried in water (to about 5% solids) and filtered.

Flocculating agent was added to each of several 100-ml. portions of the above mentioned 5% $TiO_2$ aqueous slurry in glass-stoppered graduated cylinders. The cylinders were then rotated 20 times through 360 degrees to insure adequate mixing after which they were allowed to stand 5 mintues. The ml. of supernatant formed during standing was measured.

Further details appear in Table 4 hereinafter.

TABLE 4.—TiO₂ SLURRIES

| Ex. No. | Flocculating Agent | | RSV | Ml. Supernatant After Standing 5 Mins. |
|---|---|---|---|---|
| | Name [a] | Amount [b] | | |
| 27 | None | None | | 7 |
| 28 | Commercial Flocculating agent | 250.0 | | 67 |
| 29 | do | 1,000.0 | | 76 |
| 30 | 90% Acrylamide-10% Sodium Acrylate | 1.0 | 19 | 9 |
| 31 | do | 5.0 | 19 | 14 |
| 32 | do | 12.5 | 19 | 62 |
| 33 | do | 100.0 | 19 | 80 |
| 34 | do | 1,000.0 | 19 | 80 |

[a] Examples 28 and 29 used an acrylamide-based anionic flocculating agent available commercially as "Separan NP-10."
[b] P.p.m. dry weight basis by weight of total dry solids in $TiO_2$ slurry treated, added as a 0.1% aqueous solution.

From the foregoing examples it is readily apparent that the particular copolymer flocculating agent of the present invention, as compared with typical polymeric flocculating agent of the prior art, gives substantially improved liquid-solids separation. The amount of flocculating agents of the present invention required is also considerably less than that of the prior art. Very small amounts give substantial improvements in liquid-solids separation. Generally the amount will be about 1–1000, preferably about 4–100, p.p.m. flocculating agent (dry weight basis) of the present invention by weight of the total solids (dry basis) treated.

The copolymer flocculating agents of the present invention consist of acrylamide and alkali metal or ammonium acrylate. The preferred acrylate is sodium acrylate. These copolymers consist by weight thereof essentially of 95%–25% acrylamide and 5%–75% acrylate, preferably 90%–50% acrylamide and 10%–50% acrylate. The weight percentage compositions given herein and in the claims are calculated on sodium acrylate, and it will obvious that these will vary somewhat (and to what extent they will vary) when other acrylates (e.g. potassium acrylate) are used in place sodium acrylate.

Preparation of the particular copolymer employed in the present invention is not claimed herein nor is it per se a part of the present invention. However, the preparation of said copolymer is quite important. In fact, applicant knows of only one process which will produce a product having the properties of the particular copolymer applicable in the present invention. For the sake of completeness this process will now be disclosed. It may be referred to as precipitation polymerization.

This precipitation process broadly comprises polymerizing a solution of acrylamide and acrylate monomers in aqueous tertiary butanol, aqueous acetone or aqueous tertiary butanol-acetone in the substantial absence of air while agitating the solution to give a copolymer product that can be isolated by filtration, the aqueous tertiary butanol and aqueous acetone being solvents for the monomers but nonsolvents for the copolymer product.

Several of the conditions of this precipitation polymerization process are critical, and these conditions will now be discussed.

The solvent for the monomers must be aqueous tertiary butanol, aqueous acetone, or aqueous tertiary butanol-acetone (i.e. mixtures of water with tertiary butanol or acetone alone or with both). The concentrations of water in said mixtures must be 30%–65%, preferably 45%–60%, by weight of said mixtures.

The polymerization reaction temperature must be 0° C.–60° C., preferably 0° C.–50° C.

The polymerization may be carried out either in the presence or absence of a polymerization catalyst (initiator), but preferably a polymerization initiator will be used. Both the types and amounts of free radical initiator applicable are well known in this art. Peroxygen compounds are quite suitable, including e.g. ammonium persulfate, potassium persulfate and hydrogen peroxide. Other free radical initiaors include e.g. α,α'-azo-bis-isobutyronitrile. The peroxygen initiators may be used alone or in combination with activators (also well known in this art including e.g. sodium bisulfite, sodium thiosulfate, tetramethylethylene-diamine, thiourea and ferrous chloride, said combination forming a redox system. The amount of initator usually will not exceed 0.5%, preferably is 0.05%–0.2%, 0.05% being specifically preferred, by weight of the combined weight of monomers.

Although not necessary, preferably the precipitation polymerization is carried out in the presence of a salt dissolved in the polymerization reaction mixture. By polymerizing in the presence of a salt, or a buffer system comprising one or more salts in combination with another material to complete the buffer system, recovery of the copolymer product is substantially facilitated. These salts and buffer systems include, e.g., (1) alkali metal and ammonium acetates, carbonates, bicarbonates, chlorides, phosphates, sulfates, bisulfates, borates; (2) buffer systems comprising (a) mixtures of weak acid or weak base and their salts including (b) phthalates, citrates, borates, phosphates, acetates, ammonium hydroxide, ammonium acetate, ammonium chloride, (c) specific combinations including mixtures of boric acid-borax, citric acid-sodium acid phosphate, sodium carbonate-sodium bicarbonate, ammonium chloride-ammonium hydroxide, ammonium acetate-ammonium hydroxide; or (3) any combination of (1), and (2). Said buffer systems may include for example weak acids and their corresponding alkali metal and ammonium salts, as well as ammonium hydroxide in combination with its acetate, carbonate, bicarbonate, chloride, phosphate, sulfate, bisulfate, and borate salts.

The amount of salt which may be used is about 0.1%–2.0%, preferably about 0.2%–0.7%, by weight of the reaction mixture. If the amount of salt exceeds about 2.0%, usually there is a tendency for the granules of the polymeric product to agglomerate in the polymerization reaction mixture. The manner of adding the salt and the point at which it is added are not critical.

The following is a specific example wherein the precipitation process was used in preparing the particular copolymer applicable in the present invention.

To a glass reactor fitted with a stirrer and reflux condenser cooled with ice water were charged 26.6 parts of sodium hydroxide and 210 parts of water. After dissolving and cooling, 47.9 parts of acrylic acid was added gradually with cooling to maintain the temperature below 20° C. The pH of this solution was 6.4. Then 62.5 parts of acrylamide, 222 parts of tertiary butanol, and 0.425 part of 30% hydrogen peroxide were added. The atmosphere and dissolved air were replaced with nitrogen by a series of evacuations and repressurizations with nitrogen. The temperature was raised to 25° C. and the vacuum adjusted to maintain reflux at that temperature. Then 25 parts of a 2.28% solution of thiourea in 1:1 water:tertiary butanol was pumped in at a uniform rate during 2.9 hours. During this time the copolymer formed and precipitated. After 3 hours the slurry was diluted first with 200 parts of tertiary butanol and then 200 parts of acetone. After filtering off the liquid, the copolymer was washed with acetone and then dried at 50° C. in a vacuum oven. There was obtained 115 parts of copolymer containing 94.5% solids. The RSV of the copolymer was 73. The copolymer contained 50 weight percent acrylamide and 50 weight percent sodium acrylate.

The copolymer flocculating agents of the present invention have surprisingly high molecular weights. These were determined, as indicated hereinbefore, by measuring the reduced specific viscosity (RSV—Ubbelohde) of a 0.1% solution of the copolymer in 0.1 M KCl at 25° C. The RSV varies directly with the amount of acrylate in the copolymer. The copolymers disclosed and claimed herein have an RSV of about 8–110, preferably about 17–80. Stated in another way, the following copolymers, e.g., of the present invention have the following approximate RSV values:

8–28, preferably 14–28, for a 95% acrylamide-5% acrylate copolymer
10–35, preferably 17–35, for a 90% acrylamide-10% acrylate copolymer
30–80, preferably 40–80, for a 50% acrylamide-50% acrylate copolymer
43–110, preferably 54–110, for a 25% acrylamide-75% acrylate copolymer Operating within the conditions of the process disclosed hereinbefore for making the copolymers applicable in the present invention, RSV varies directly with total monomer concentration and inversely with polymerization temperature and amount of initiator.

Although the flocculating agent in accordance with the present invention may be added in dry form to the aqueous suspension being treated, it is preferred to add it as an aqueous solution in order to get faster and more complete dispersion thereof throughout the aqueous suspension.

As many apparent and widely different embodiments of

What I claim and desire to protect by Letters Patent is:

1. Process for aiding the separation of finely divided predominantly inorganic solids from aqueous suspensions thereof which comprises admixing with said suspensions an acrylamide-acrylate copolymer in an amount sufficient to flocculate the suspended solids and prepared by polymerizing said monomers at a temperature of about 0° C.–60° C. in a mixture comprising (a) tertiary butanol and water, (b) acetone and water, or (c) tertiary butanol, acetone and water, the amount of water in said mixture being about 30%–65% by weight thereof.

2. Process of claim 1 wherein the copolymer consists by weight thereof essentially of 95%–25% acrylamide and 5%–75% sodium acrylate.

3. Process of claim 1 wherein the copolymer consists by weight thereof essentially of 90%–50% acrylamide and 10%–50% sodium acrylate.

4. Process of claim 1 wherein the copolymer is an acrylamide-alkali metal acrylate and the amount thereof is about 1–1000 p.p.m., dry weight basis by weight of said solids in the suspensions.

5. Process of claim 4 wherein the amount of copolymer is about 4–100 p.p.m., dry weight basis by weight of said solids in the suspension.

References Cited

UNITED STATES PATENTS

| | | | |
|---|---|---|---|
| 3,118,832 | 1/1964 | Katzer et al. | 210—54 |
| 3,377,274 | 4/1968 | Burke et al. | 210—54 X |

FOREIGN PATENTS

| | | |
|---|---|---|
| 991,416 | 5/1965 | Great Britain. |

MICHAEL E. ROGERS, Primary Examiner

U.S. Cl. X.R.

260—89.7